(12) United States Patent
Balachandriah et al.

(10) Patent No.: US 8,468,385 B1
(45) Date of Patent: Jun. 18, 2013

(54) METHOD AND SYSTEM FOR HANDLING ERROR EVENTS

(75) Inventors: Sridhar Balachandriah, Bangalore (IN); Bhaskar Singhal, Meerut (IN)

(73) Assignee: Netapp, Inc., Sunnyvale, CA (US)

( * ) Notice: Subject to any disclaimer, the term of this patent is extended or adjusted under 35 U.S.C. 154(b) by 279 days.

(21) Appl. No.: 12/913,186

(22) Filed: Oct. 27, 2010

(51) Int. Cl.
*G06F 11/07* (2006.01)
(52) U.S. Cl.
USPC .................. 714/6.2; 714/42; 714/3; 714/4.2
(58) Field of Classification Search
USPC ..................................... 714/6.2, 42
See application file for complete search history.

(56) References Cited

U.S. PATENT DOCUMENTS

| | | | | |
|---|---|---|---|---|
| 4,392,207 | A * | 7/1983 | Dockal | 710/64 |
| 7,293,191 | B1 * | 11/2007 | Arumugham et al. | 714/5.11 |
| 7,386,662 | B1 * | 6/2008 | Kekre et al. | 711/113 |
| 7,389,379 | B1 * | 6/2008 | Goel et al. | 711/112 |
| 7,406,617 | B1 * | 7/2008 | Athreya et al. | 714/4.11 |
| 7,636,801 | B1 * | 12/2009 | Kekre et al. | 710/31 |
| 2002/0174207 | A1 * | 11/2002 | Battou | 709/223 |
| 2005/0114728 | A1 * | 5/2005 | Aizawa et al. | 714/6 |
| 2005/0259571 | A1 * | 11/2005 | Battou | 370/217 |
| 2006/0112219 | A1 * | 5/2006 | Chawla et al. | 711/114 |
| 2006/0235649 | A1 * | 10/2006 | Lancaster et al. | 702/182 |
| 2007/0250723 | A1 * | 10/2007 | Shima et al. | 713/300 |
| 2008/0189572 | A1 * | 8/2008 | McBride et al. | 714/5 |
| 2009/0204743 | A1 * | 8/2009 | Inoue et al. | 711/100 |
| 2010/0115143 | A1 * | 5/2010 | Nakajima | 710/5 |
| 2010/0306575 | A1 * | 12/2010 | Futawatari | 714/5 |

* cited by examiner

*Primary Examiner* — Chae Ko
(74) *Attorney, Agent, or Firm* — Klein, O'Neill & Singh, LLP

(57) ABSTRACT

Method and system for managing error related events while a system is processing input/output ("I/O") requests for accessing storage space is provided. Various components are involved in processing the I/O requests. Some of these components may also have sub-components. Events related to the various components are classified with respect to their severity levels. Threshold values for a frequency of these events is set and stored in a data structure at a memory location. When an event occurs, the severity level and the threshold value for the event are determined from the data structure. The actual frequency is then compared to the stored threshold value. If the threshold value is violated and there is an alternate path to route the I/O request, then the affected component is restricted and the alternate path is used to route the I/O request.

19 Claims, 8 Drawing Sheets

METHOD AND SYSTEM FOR HANDLING ERROR EVENTS

TECHNICAL FIELD

The present disclosure relates to storage systems.

BACKGROUND

Various forms of storage systems are used today. These forms include network attached storage (NAS) systems, storage area networks (SANs), and others. SANs typically use a network of storage devices for storing information. The storage devices appear as local storage to computing systems that operate within the SAN.

Typically, a SAN uses a plurality of components for providing access to storage. For example, a plurality of fabric switches, a plurality of adapters and other components may be used for processing input/output (I/O) requests. An I/O request is typically generated by one or more computing systems to read and write information to and from a storage device. Some of these components may fail while I/O requests are being processed. Continuous efforts are being made to handle errors and failure events for efficiently processing I/O requests.

SUMMARY

In one embodiment, a method and system for managing error related events while a system is processing input/output ("I/O") requests for accessing storage space is provided. Various components are involved in processing an I/O request. Some of these components also have sub-components. Events related to the various components are classified with respect to their severity levels. Threshold values for a frequency of these events is set and stored in a data structure at a memory location.

When an event occurs, the severity level and the threshold value for the event are determined from the data structure. The actual frequency is then compared to the stored threshold value. If the threshold value is violated and there is an alternate path to route the I/O request, then the affected component is restricted and the alternate path is used to route the I/O request. Other systems, for example, nodes within a cluster environment that use the affected component are notified of the alternate path. If there is no alternate path then the event is logged indicating a possible component failure.

In another embodiment, a system is provided. The system includes a storage system coupled to a storage device and a client computing system via a plurality of components with some of the plurality of components having sub-components. The plurality of components and the sub-components are used for processing input/output requests for reading and writing information at the storage device.

The system also includes a processor executing instructions for establishing a classification criterion for classifying error events associated with the plurality of components; and establishing a threshold value for each of the plurality of components for error events associated with the plurality of components. If an event frequency for an error event associated with a component violates an associated threshold value, then the usage of the component and the sub-component is automatically restricted.

In yet another embodiment, a machine implemented method is provided. The method includes receiving notification of an event associated with a component used in a network for processing an input/output (I/O) request for reading and writing information to a storage device; determining if the component includes any sub-components; and determining a classification of the event to ascertain a severity level.

The method further includes determining if an event frequency for the determined classification violates a threshold value that is set for restricting a usage of the component and the sub-component; and restricting the usage of the component and the sub-component if the set threshold value for the classified event is violated.

In another embodiment, a machine implemented method is provided. The method includes identifying a plurality of components within a network used for processing input/output ("I/O") requests for reading and writing information at a storage device; and identifying which of the plurality of components include sub-components.

The method further includes establishing a classification criteria for classifying error events associated with the plurality of components; establishing a threshold value for the plurality of components for error events associated with the plurality of components; and restricting usage of a component, based on an error event that violates the threshold value for the component.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

In one embodiment, a method and system for managing error related events while a system is processing input/output ("I/O") requests for accessing storage space is provided. Various components are involved in processing an I/O request. Some of these components also have sub-components. Events related to the various components are classified with respect to their severity levels. Threshold values for a frequency of these events is set and stored in a data structure at a memory location.

When an event occurs, the severity level and the threshold value for the event are determined from the data structure. The actual frequency is then compared to the stored threshold value. If the threshold value is violated and there is an alternate path to route the I/O request, then the affected component is restricted and the alternate path is used to route the I/O request. Other systems, for example, a node within a cluster environment that uses the affected component is notified of the alternate path. If there is no alternate path then the event is logged indicating a possible component failure.

As a preliminary note, the terms "component", "module", "system," and the like as used in this disclosure are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

Figure 1A:
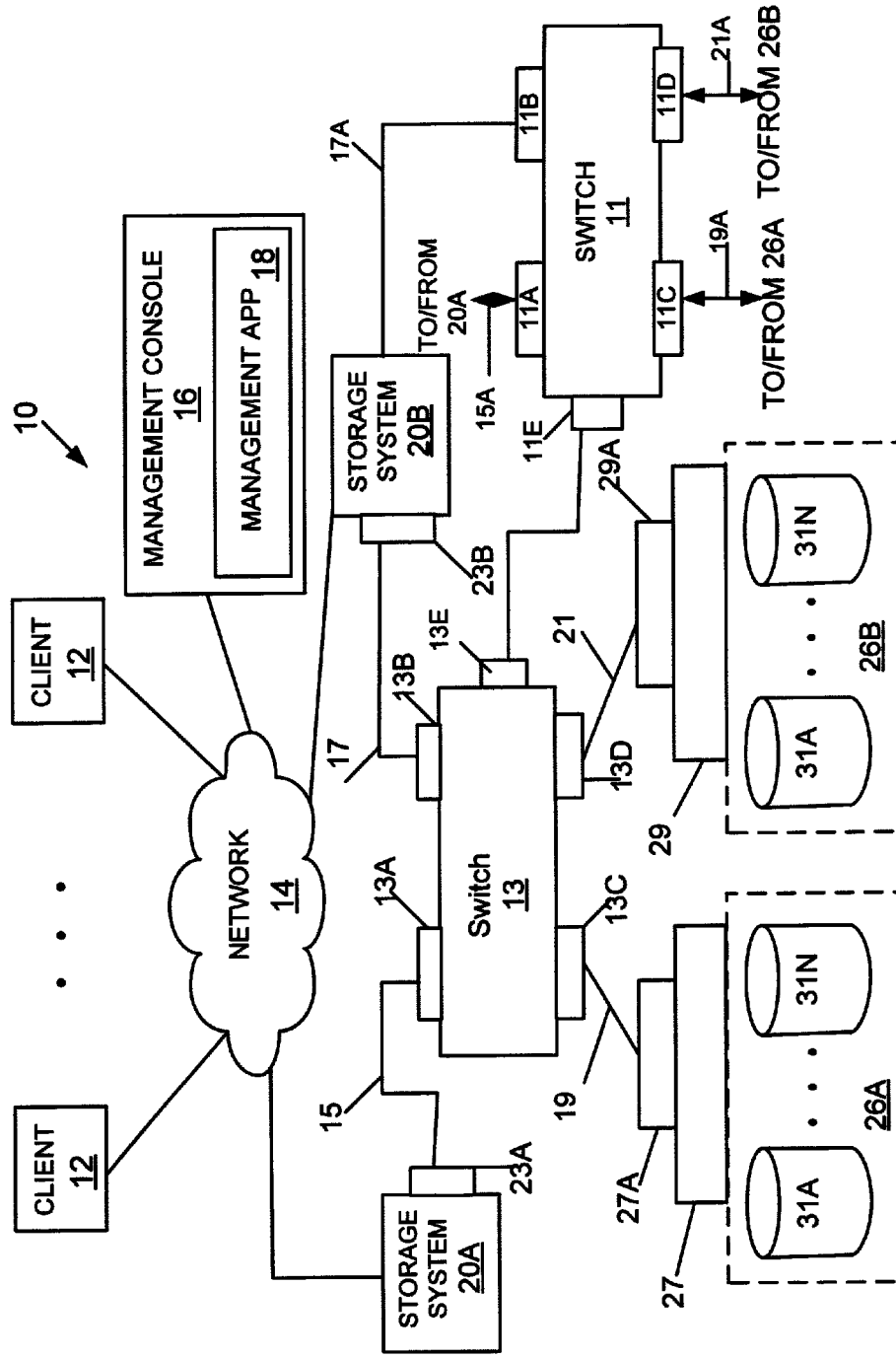
FIG. 1A shows a block diagram of a system using the embodiments disclosed herein.

System:

FIG. 1A shows an example of a system 10 for implementing the various embodiments of the present disclosure, as described below. System 10 includes a plurality of storage systems 20A-20B (may also be referred to as storage system 20 or storage systems 20) that are connected to storage subsystems 26A/26B via adapters 23A and 23B, switch 11 and 13 (may also be referred to as fabric switch 11 or 13). It is noteworthy that the adaptive embodiments disclosed herein are not limited to any particular number of storage systems, storage subsystems, fabric switch or any other components.

Switch 13 includes various ports 13A-13E to operationally couple different modules of system 10. For example, port 13A is operationally coupled to adapter 23A of storage system 20A via a link 15, port 13B is operationally coupled to adapter 23B of storage system 20B via a link 17. Port 13C is operationally coupled to an adapter port 27A of an adapter 27 via a link 19. Port 13D is operationally coupled to an adapter port 29A of adapter 29 via a link 21. Port 13E is used to communicate with switch 11.

Ports 13A-13E include logic and circuitry to handle information (for example, frames and packets) complying with certain standard protocols, for example, Fibre Channel, Fibre Channel over Ethernet and others. Links 15, 17, 19 and 21 are used to carry information between the various components mentioned above Switch 11 is similar to switch 13 and may provide alternate connection paths for processing I/O requests.

Switch 11 may also include a plurality of ports 11A-11E. Port 11A is operationally coupled to storage system 20A via link 15A, while port 11B is operationally coupled to storage system 20B via link 17A. Port 11C is operationally coupled to storage subsystem 26A via link 19A and port 11D is operationally coupled to storage subsystem 26B via link 21A. Port 11E is operationally coupled to port 13E of switch 13.

Ports 11A-11E may also include logic and circuitry to handle information (for example, frames and packets) complying with certain standard protocols, for example, Fibre Channel, Fibre Channel over Ethernet and others. Similar to links 15, 17, 19 and 21, links 15A, 17A, 19A and 21A are used to carry information between the various components mentioned above.

Switch 11 and 13 provide storage systems 20A and 20B with various routing paths to access storage sub-systems 26A and 26B. The routing paths may be stored in routing tables at each storage system and may also be maintained by management application 18.

Adapters 27 and 29 are used by the storage subsystems 26A and 26B to respond to I/O requests from storage systems 20A-20B. Adapter ports 27A and 29A include logic and circuitry for sending and receiving information in compliance with certain standard protocols, for example, Fibre Channel, Fibre Channel over Ethernet and others.

Storage subsystems 26A and 26B include a plurality of mass storage devices 31A-31N. The I/O requests from storage system 20A/20B are typically used to read or write information to the plurality of mass storage devices 31A-31N. The mass storage devices 31A-31N in each storage subsystem 26 may be, for example, conventional magnetic disks, optical disks such as CD-ROM or DVD based storage, magneto-optical (MO) storage, flash memory storage device or any other type of non-volatile storage devices suitable for storing data. The examples disclosed herein may reference a storage device as a "disk" but the adaptive embodiments disclosed herein are not limited to disks or any particular type of storage media/device.

The storage systems 20A and 20B may be operationally coupled to a plurality of clients 12 through a network 14. Each storage system receives and responds to various read and write requests from clients 12, directed to data stored in or to be stored in a corresponding storage subsystem via switch 13 or switch 11 and adapters 27 and 29.

Each client 12 may be, for example, a conventional personal computer (PC), workstation, or the like. The network 14 may be, for example, a local area network (LAN), a wide area network (WAN), a storage area network (SAN), or any other type of network or a combination of networks.

Also connected to the network 14 is a management console 16 that may store and execute a management application 18 (may also be referred to as a storage management application 18). The management console 16 may be, for example, a conventional PC, a workstation, or the like. The management application 18 may be used by a storage network administrator to manage a pool of storage devices and various components of system 10, for example, switch 11, switch 13, adapters 27 and 29 and others, as described below in more detail.

Management application 18 is configured to collect various parameters and data from the operating systems of the storage systems and different components of system 10. To obtain such information, communication between the management application 18, clients 12 and storage systems 20 may be accomplished using any of the various conventional communication protocols and/or application programming interfaces (APIs), the details of which are not germane to the technique being introduced here. This communication can be done through the network 14 or it can be via a direct link (not shown) between the management console 16 and the storage systems 20A and 20B.

Figure 1B:
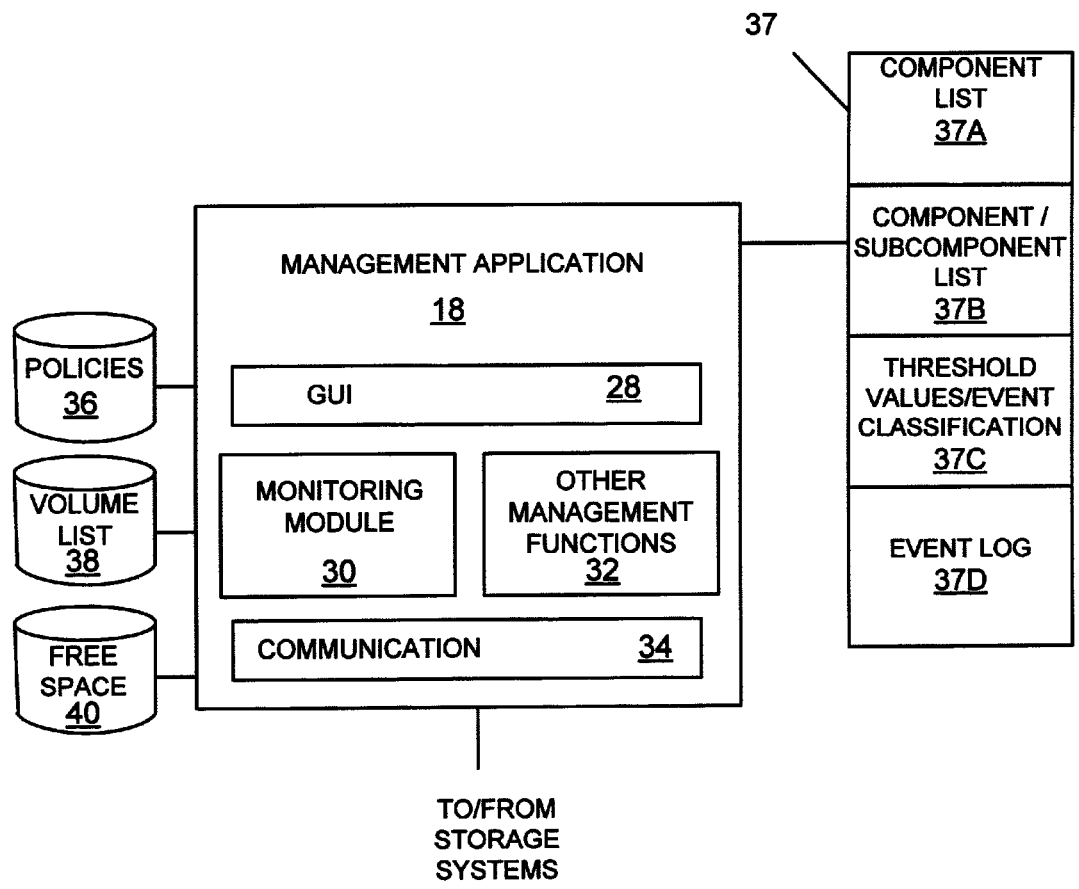
FIG. 1B shows a block diagram of a management application, used according to one embodiment of the present disclosure.

Management Application: FIG. 1B illustrates the management application 18 in greater detail for implementing the various processes described below, according to one embodiment. In the illustrated embodiment, the management application 18 includes a graphical user interface (GUI) module 28 to generate a GUI (e.g., for use by an administrator); a monitoring module 30 for configuring and monitoring various components of system 10; one or more other management modules 32 to perform various other storage management related functions; and a communication module 34. In another embodiment, the management application 18 may provide a command line interface (CLI) for use by an administrator for managing and configuring various components of system 10. The communication module 34 implements one or more conventional communication protocols and/or APIs to enable the management application 18 to communicate with the storage systems 20, clients 12, switch 11, switch 13 and storage subsystems 26A and 26B.

Monitoring module 30 maintains a monitoring data structure 37 (may also be referred to as data structure 37) for storing information regarding various components of system 10. For example, data structure 37 may include a listing 37A of all the components of system 10 that are used for processing I/O requests for all routing paths. For example, a listing of storage devices 31A and 31N, switches 11 and 13, adapters 27 and 29 and links 15/15A, 17/17A, 19/19A and 21/21A. The routing paths itself may be included in segment 37A or may be include in a routing table separate from data structure 37. The routing table may maintained by each storage system.

Data structure 37 includes segment 37B for storing information regarding components of segment 37A that may have sub-components. For example, switch 13 (or switch 11) may be categorized as a component with ports 13A-13E as sub-components in listing 37B. A cable or SFP (Small Form Pluggable Transceiver for a port for receiving and sending frames) (not shown) may be designated as component without any sub-components and hence may only reside in listing 37A.

Monitoring module 30 may also store certain threshold values in segment 37C (or data structure 37C) for various components and sub-components. Segment 37C may also be used to store different event categories. The event categories classify events related to components and sub-components as being minor, major and critical. The classification is based on the impact of different events. The threshold values for different event categories are used to determine whether a particular component and/or sub-component should be restricted and an alternate path, if available, be used for servicing an I/O request. For example, if a component has N sub-components and there is an error $E_{rsc}$ for M sub-components. Then monitoring module 30 may set a threshold value, where if $E_{rsc}$ is greater than or equal to ¼ of N subcomponents, then the component is restricted for use and an alternate path is sought. In this example, if $E_{rsc}$ is greater than or equal to ¼ of N violates the set threshold value.

Monitoring module 30 may also set up threshold values for sub-components, for example, a number of errors reported in an hour ($E_{nH}$) and a number of errors reported by a sub-component in a day ($E_{nD}$). Monitoring module 30 may set $E_{nH}$ to a certain value, for example, 5, and if the number of errors within an hour is equal to or greater than 5, then the associated sub-component is restricted because the set threshold value is violated. Monitoring module 30 may configure $E_{nH}$ in a way that if errors are seen only at a particular time during the day, then the restriction is selectively applied only during that duration.

Monitoring module 30 may also set a certain value, for example, 5 for $E_{nD}$ such that if there are 5 errors from a sub-component within a day, then the sub-component is restricted for use because the set threshold value is violated.

It is noteworthy that the examples given above are shown only to illustrate the use of the threshold values and not limit the threshold values to any particular value. These values are programmable and can be set based on the overall operating conditions of system 10.

Monitoring data structure 37 also maintains an event log 37D. The event log 37D is used to store information regarding different events and how often the events occur, i.e. the frequency of the events. The use of the frequency and event information from event log 37D and threshold values 37C is described below in more detail.

In one embodiment, although data structure 37 is shown to have multiple component/segments, for example, 37A-37D, they may be included in an integrated single data structure. In a distributed architecture, different components of data structure 37 may be stored in different memory locations and may be accessible to management application 18 via network 14.

Data structure 37 may be maintained by management application 18 at a memory location that is accessible to management application 18. For example, the memory location may be local to the management console 16 that executes management application 18 or may be remote to management console 16.

It is noteworthy that although monitoring module 30 and data structure 37 have been described above with respect to management application 18, the adaptive embodiments described herein are not limited to management application 18. As described below in more detail, monitoring module 30 and data structure 37 may be executed and maintained by one or more storage systems 20A and/or 20B.

The management application 18 may also maintain policies 36, a list 38 of all volumes in a storage pool as well as a data structure 40 (shown as free space 40) with information regarding all free storage space in a storage pool. Free space 40 may include details regarding storage space that may be available for a user at any given time. In one embodiment, management application 18 may use policies 36, volume list 38 and free space 40 for allocating and managing storage space in system 10.

Figure 1C:
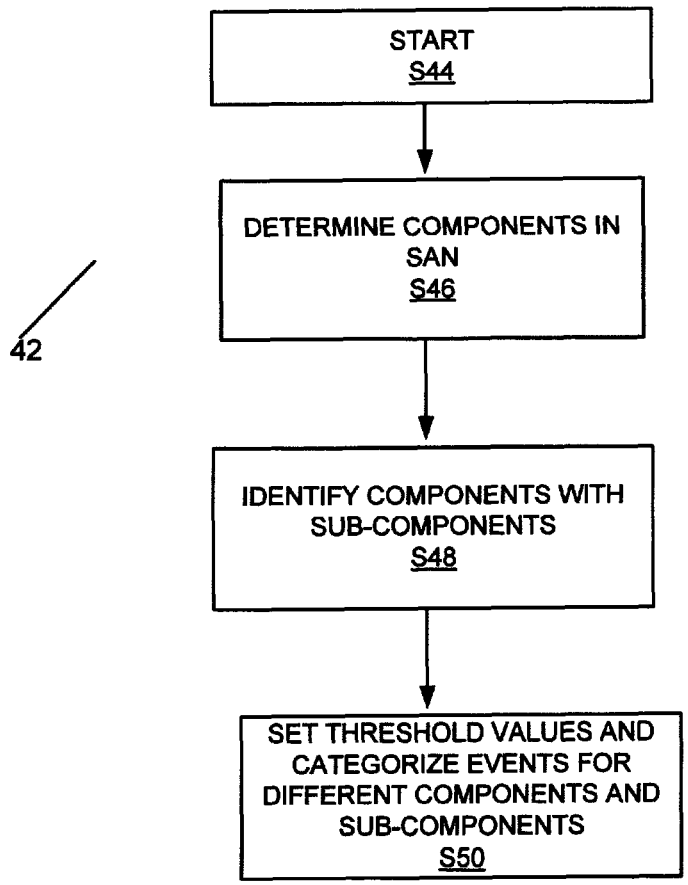
FIGS. 1C-1D show process flow diagrams for migrating a virtual storage system, according to one embodiment.

Process Flow:

FIG. 1C shows a process 42 for configuring the different components of system 10, according to one embodiment. The various process blocks of FIG. 1C are described below with the monitoring module 30 being executed by management application 18. However, as mentioned above, the embodiments disclosed herein are not limited to management application 18. The process steps described below may be implemented by storage systems 20A and/or 20B.

The process starts in block S44 when an administrator sets up system 10. In another embodiment, the configuration or re-configuration may take place when system 10 is already operational. In block S46, the various components in system 10 are determined. In one embodiment, this information may be ascertained by management application 18 that communicates with various components in system 10. The manner in which this information is gathered depends on the protocol type. For example, in a Fibre Channel SAN, management application 18 can query all the components that are connected at any given time using Fibre Channel commands.

In block S48, various components and their sub-components of system 10 are identified. This information is used to build segment 37A and 37B of FIG. 1B. In one embodiment, all components are first identified and then a list of components having sub-components is created (37B). As an example, switch 11 and 13 may be a categorized as components with sub-components (for example, ports) while a cable or SFP (Small Form Pluggable Transceiver for a port) (not shown) used by switches 11 and 13 may be designated as components without any sub-components.

In block S50, in one embodiment, management application 18 may be used to set up threshold values for different components and/or sub-components and categorizes different events that are related to the components and sub-components. The threshold values and event categories are used to determine when a component and/or a sub-component should be restricted such that the component and/or sub-component do not hinder processing of an I/O request.

Event categories or classification separate events into different categories, for example, minor, major and critical. The event categories depend on the type and functionality of the components/sub-components. As an example, a switch may report different types of error events. The events may include congestion due to lack of credit at switch memory buffers, a port being down due to a sub-component failure, communication failure due to a link being down and others. These events can be categorized as being minor, major and critical. The threshold values are then associated with each category of events to restrict the usage of components and sub-components. The following provides an example of setting the threshold values.

Assume that a component C includes n sub components and component C is represented by $S_n$, where $S_n=(S_1+S_2S_3+\ldots S_n)$ (Equation 1).

The sum of m components that may have failed is represented as $E_{rsc}$, where $$E_{rsc}=(S_1+S_2+S_3+\ldots +S_m)$$ (Equation II)

If $E_{rsc}>=$(greater than or equal to) $(\frac{1}{4}*S_n)$ and if the error events are critical then a component that generates those events is restricted and an alternate path is sought to process an I/O request. It is noteworthy that this restriction is applied to all storage systems/nodes that use the restricted component.

If a single sub-component (for example, a cable or a SFP) reports failure events then the following threshold values may be set to restrict the sub-component:

$E_{nH}$=Number of error events reported for the sub component in an hour.

$E_{nD}$=Number of error events reported in a day for a sub-component.

An administrator may set a value for both $E_{nH}$ and $E_{nD}$ to restrict the usage of the sub-component. For example, if $E_{nH}$ exceeds a threshold value of 5 then the sub-component is restricted when the events are critical. The value may be 10 if the events are major or 15 if the events are minor. In another example, if $E_{nH}$ occurs during a particular time of day then the restricting principle is applied only for that duration.

In yet another example, if $E_{nD}$ exceeds a threshold of, for example, 5 for critical events, then the sub-component is restricted. The value may be 10 if the events are major or 15 if the events are minor.

It is noteworthy that the embodiments disclosed herein are not limited to any particular threshold value or event category. Different threshold values and event categories may be set based on system 10 and user needs. The threshold values and event categories may be changed by a user using management application 18.

Figure 1D:
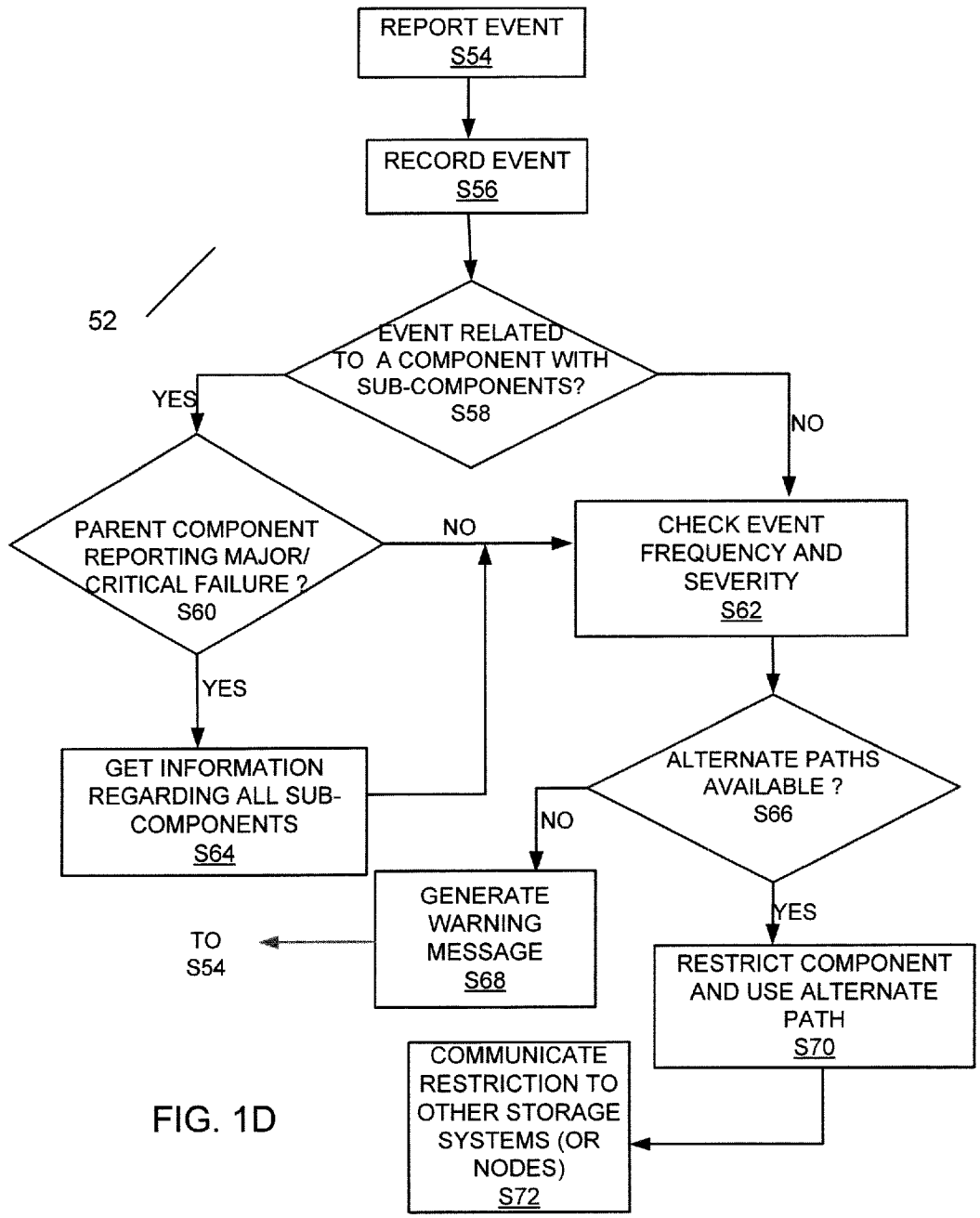

FIG. 1D shows a process flow 52 for restricting the use of a component or a sub-component, according to one embodiment. The process starts in block S54 when an error event with respect to a component and/or sub-component is reported. An error event in this context may be an error response or a lack of response from a component and/or sub-component. The event is recorded in block S56 and stored at a memory location as data structure 37D. In one embodiment, management application 18 maintains the data structure 37D for recording events for the components and sub-components. The data structure 37D identifies the component, the event type and category, i.e., whether the event is minor, major or critical.

In block S58, management application 18 determines if the event is related to a component with sub-components. Management application uses segment 37B to ascertain this information. If the event is not related to a component with sub-components, then the process moves to block S62 that is described below. If the event is related to a component with sub-components, then the process moves to block S60.

In block S60, management application 18 determines whether the parent component is reporting an error of certain severity, for example, a major or critical error. Segment 37D is used to ascertain the nature of the event. If the reported event is major or critical, then data regarding all the sub-components is collected in block S64 and the process moves to block S62. If the event is not a major or critical event, then the process simply moves to block S62.

In block S62, the frequency and nature of the event is compared to programmed threshold values for the event. The frequency of the event may be determined by monitoring module 30 (FIG. 1B) or monitoring module 312 (FIG. 3) by examining the event log 37D. The threshold values may be set, as described above with respect to equations I-II. If the threshold values are violated by the event frequency and severity, then in block S66, management application 18 determines if there are any alternate paths for servicing the I/O request. The programmed threshold values are violated if the actual error frequency for a certain severity level is equal to or exceeds the programmed threshold values.

If alternate paths are available, then the affected component and/or sub-component are restricted for use in block S70 and an alternate path from available alternate paths is selected for processing the I/O. The different routing paths (including the alternate paths) that may be used by storage system 20A and 20B to access storage sub-systems 26A and 26B may be stored in a routing table, as described above.

In block S72, the restriction is communicated to other storage systems such that alternate paths may be selected for all storage systems that use the affected components. For example, with respect to FIG. 1A, if both storage systems 20A and 20B use switch 13 to access storage and switch 13 is the affected component, then the use of switch 13 is restricted for both storage systems 20A and 20B. In this example, switch 11 may be used as an alternate path by both storage systems 20A and 20B.

In a cluster environment described below with respect to FIG. 1E, a plurality of nodes may use a same path with the restricted component. All the nodes are notified of the restricted component in block S72. This allows the nodes to seek alternate paths without the restricted component.

If there are no alternate paths, then a warning message is generated in block S68 and the process moves back to block S54 for processing the next event.

In one embodiment, events are categorized and thresholds are established for different event types as described above with respect to FIGS. 1C and 1D. When an error event occurs, the processes described above isolate components and sub-components and when available, use alternate paths. This allows one to process I/O requests and isolate error generating components and sub-components.

The embodiments disclosed herein are especially useful in a cluster environment where various nodes are interconnected. A brief description of a cluster environment is provided below.

Figure 1E:
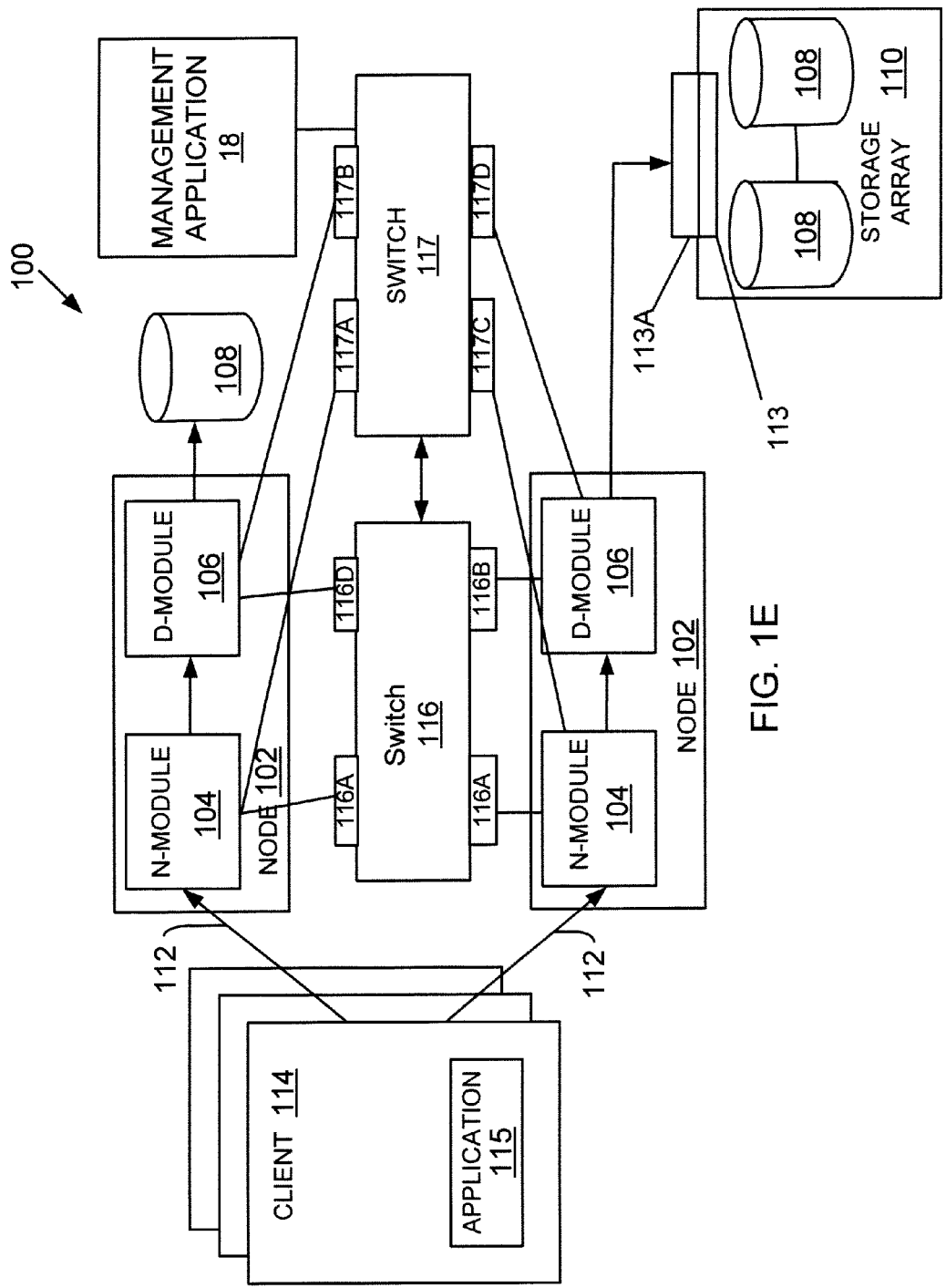
FIG. 1E shows a block diagram of a clustered system, according to one embodiment.

Clustered System:

FIG. 1E shows a cluster 100 having a plurality of interconnected nodes 102 configured to provide storage services related to information stored at a plurality storage devices 108. The cluster system 100 may be identified by using a unique name, for example, a global namespace.

The process flow of FIGS. 1C and 1D described above are applicable to cluster 100. For example, cluster 100 uses a plurality of nodes 102 with various components and sub-components. When a component is restricted for one node, then the other nodes are notified of the restriction such that the restricted component does not impair the ability of other nodes to process I/O requests. Because of the notification, other nodes may also be able to find alternate paths, if available, and hence avoid the restricted component.

Nodes 102 comprise various functional components that cooperate to provide distributed storage system architecture of cluster 100. Each node 102 is generally organized as a network element (N-module 104) and a disk element (D-module 106). N-module 104 includes functionality that enables node 102 to connect to clients 114 over a computer network 112 and to management application 18, while each D-module 106 connects to one or more storage devices 108 (may generically be referred to as disks 108) or storage array 110 via an adapter 113 having at least one port 113A. Adapter 113 may be categorized as a parent component with sub-components.

Figure 2:
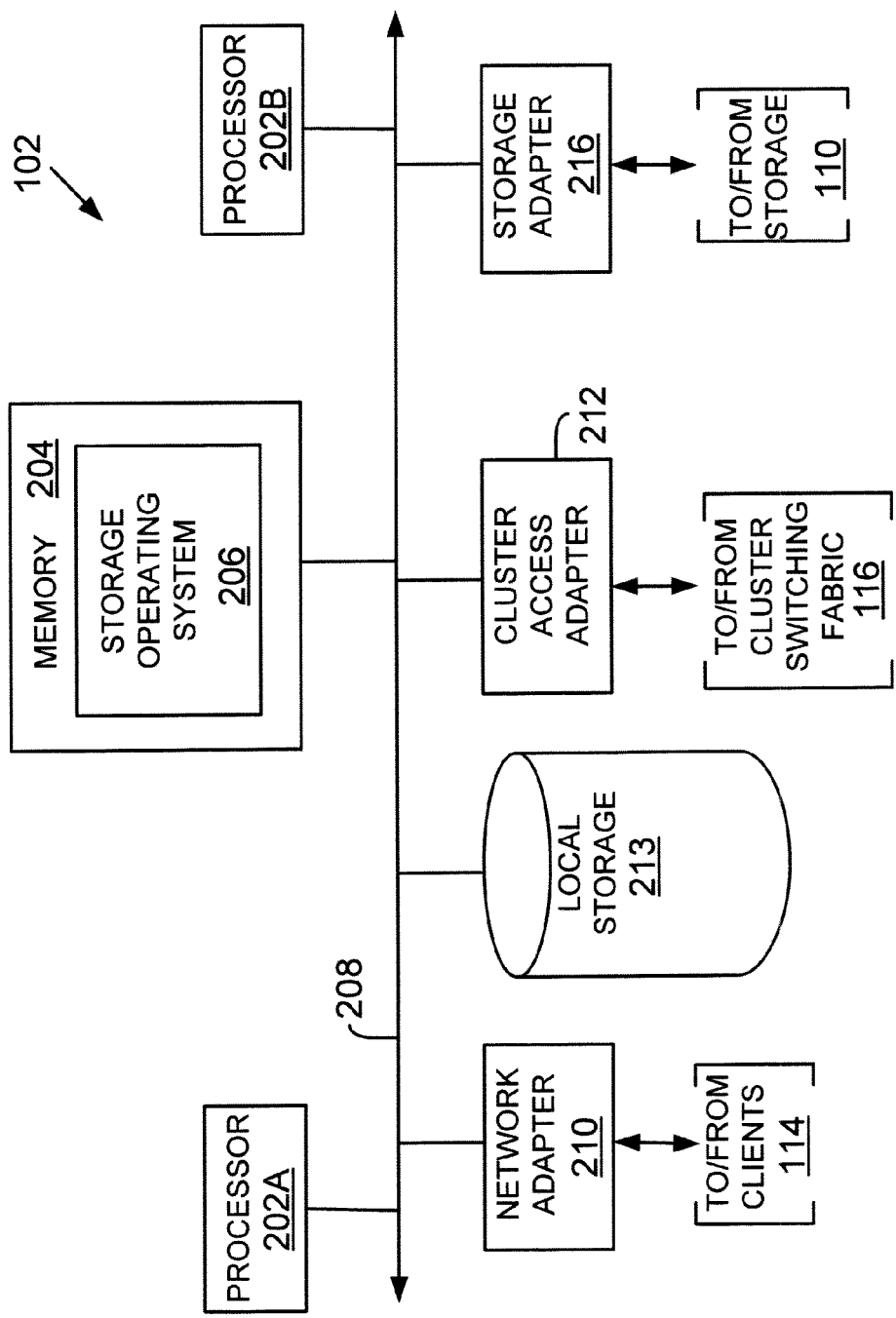
FIG. 2 shows a block diagram of a node, used according to one embodiment.

Each N-module and D-module may also include their own adapters/logic for interfacing with each other and storage devices. FIG. 2 described below provide examples of such adapters/logic.

It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 102 comprising one N-module and one D-module should be taken as illustrative only.

Nodes 102 may be interconnected by a cluster switching fabric 116 with ports 116A-116D, which, in the illustrative embodiment, may be embodied as a Gigabit Ethernet switch. Switch 116 may be categorized as a parent component with sub-components, similar to switch 13 of FIG. 1A.

Switch 117 with ports 117A-117D may be used for an alternate path, if a communication path via switch 116 is restricted based on the process flow of FIG. 1D, described above in detail.

Clients 114 (similar to clients 12, FIG. 1*a*, may be configured to interact with a node 102 in accordance with a client/server model of information delivery. That is, each client 114 may request the services of the node 102, and the node 102 may return the results for the services requested by the client 114, by exchanging packets over the network 112.

For a SAN based configuration, client 114 may issue I/O requests using application 115 complying with block-based access protocols, such as the Small Computer Systems Interface ("SCSI") protocol encapsulated over TCP (iSCSI) and SCSI encapsulated over FCP. Alternatively, client 114 may issue packets using application 115 including file-based access protocols, such as the CIFS protocol or the NFS protocol, over TCP/IP when accessing information in the form of certain data containers. Data container means a block, a file, a logical unit of data or any other information. CIFS means the Common Internet File System Protocol, an access protocol that client systems use to request file access services from storage systems over a network. NFS means Network File System, a protocol that allows a user to access storage over a network.

Cluster 100 also uses management application 18 that communicates with the plurality of nodes 102 for generating and maintaining the data structure 37 described above with respect to FIG. 1B. The use of data structure 37 has been described above with respect to FIGS. 1B-1D Storage System Node:

FIG. 2 is a block diagram of a node 102 used in cluster 100, described above with respect to FIG. 1E. Node 102 may include a plurality of processors (202A and 202B), a memory 204, a network adapter 210, a cluster access adapter 212, a storage adapter 216 and local storage 213 interconnected by a system bus 208. The local storage 213 comprises one or more storage devices, such as disks, utilized by the node to locally store configuration information.

The cluster access adapter 212 comprises a plurality of ports adapted to couple node 102 to other nodes of cluster 100. Cluster adapter 212 may be categorized as a component that is monitored and managed using the process flow diagrams described above with respect to FIGS. 1C and 1D.

In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 212 is utilized by the N/D-module for communicating with other N/D-modules in the cluster 100.

Each node 102 is illustratively embodied as a dual processor storage system executing a storage operating system 206 that preferably implements a high-level module, such as a file system, to logically organize the information as a hierarchical structure of named directories, files and special types of files called virtual disks (hereinafter generally "blocks") on storage devices 108. However, it will be apparent to those of ordinary skill in the art that the node 102 may alternatively comprise a single or more than two processor systems. Illustratively, one processor 202A executes the functions of the N-module 104 on the node, while the other processor 202B executes the functions of the O-module 106.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 206, portions of which is typically resident in memory and executed by the processing elements, functionally organizes the node 102 by, inter alia, invoking storage operations in support of the storage service implemented by the node. An example of operating system 206 is the DATA ONTAP® (Registered trademark of NetApp, Inc. operating system available from NetApp, Inc.

However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 210 comprises a plurality of ports adapted to couple the node 102 to one or more clients 114 over point-to-point links, wide area networks, virtual private networks implemented over a public network (Internet) or a shared local area network. The network adapter 210 thus may comprise the mechanical, electrical and signaling circuitry needed to connect the node to the network. Network adapter 210 may be categorized as a component that is monitored and managed using the process flow diagrams described above with respect to FIGS. 1C and 1D. Illustratively, the computer network 112 may be embodied as an Ethernet network or a FC network. Each client 114 may communicate with the node over network 112 by exchanging discrete frames or packets of data according to pre-defined protocols, such as TCP/IP.

The storage adapter 216 cooperates with the storage operating system 206 executing on the node 102 to access information requested by the clients and management application 18. The information may be stored on any type of attached array of writable storage device media such as video tape, optical, DVD, magnetic tape, bubble memory, electronic random access memory, flash memory devices, micro-electro mechanical and any other similar media adapted to store information, including data and parity information. However, as illustratively described herein, the information is preferably stored on the disks 108 of storage array 110. The storage adapter 216 comprises a plurality of ports having input/output (I/O) interface circuitry that couples to the disks over an I/O interconnect arrangement, such as a conventional high-performance, FC link topology. Storage adapter 216 may also be categorized as a component that is monitored and managed using the process flow diagrams described above with respect to FIGS. 1C and 1D.

Figure 3:
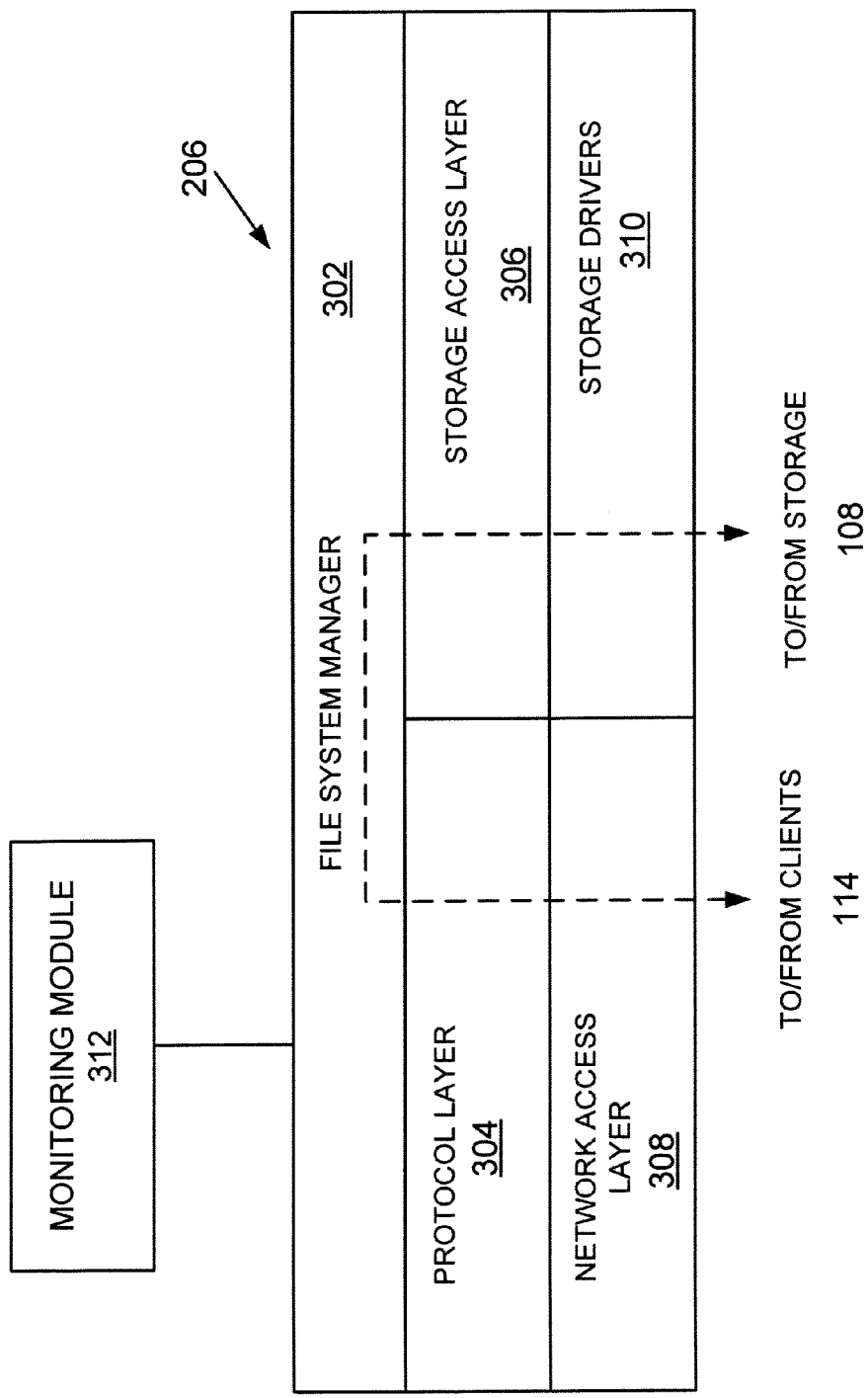
FIG. 3 shows an example of an operating system used according to one embodiment.

Operating System:

FIG. 3 illustrates a generic example of operating system 206 executed by node 102, according to one embodiment of the present disclosure. Although the various process steps above have been described respect to management application 18, the process steps may be implemented by a monitoring module 312 (similar to monitoring module 30, FIG. 1B) that interfaces with operating system 206 or is an integral part of operating system 206. Monitoring module 312 maintains data structures 37A-37D and processes the events related to different components and sub-components.

In one example, operating system 206 may include several modules, or "layers" executed by one or both of N-Module 104 and D-Module 106. These layers include a file system manager 302 that keeps track of a directory structure (hierarchy) of the data stored in storage devices and manages read/write operations, i.e., executes read/write operations on disks in response to client 114 requests.

Operating system 206 may also include a protocol layer 304 and an associated network access layer 308, to allow node 102 to communicate over a network with other systems, such as clients 114 and management application 18. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between clients 114 and mass storage devices 108 are illustrated schematically as a path, which illustrates the flow of data through operating system 206.

The operating system 206 may also include a storage access layer 306 and an associated storage driver layer 310 to allow D-module 106 to communicate with a storage device. The storage access layer 306 may implement a higher-level disk storage protocol, such as RAID (redundant array of inexpensive disks), while the storage driver layer 310 may implement a lower-level storage device access protocol, such as FC or SCSI.

It should be noted that the software "path" through the operating system layers described above needed to perform data storage access for a client request received at node 102 may alternatively be implemented in hardware. That is, in an alternate embodiment of the disclosure, the storage access request data path may be implemented as logic circuitry embodied within a field programmable gate array (FPGA) or an ASIC.

As used herein, the term "storage operating system" generally refers to the computer-executable code operable on a computer to perform a storage function that manages data access and may, in the case of a node 102, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 4:
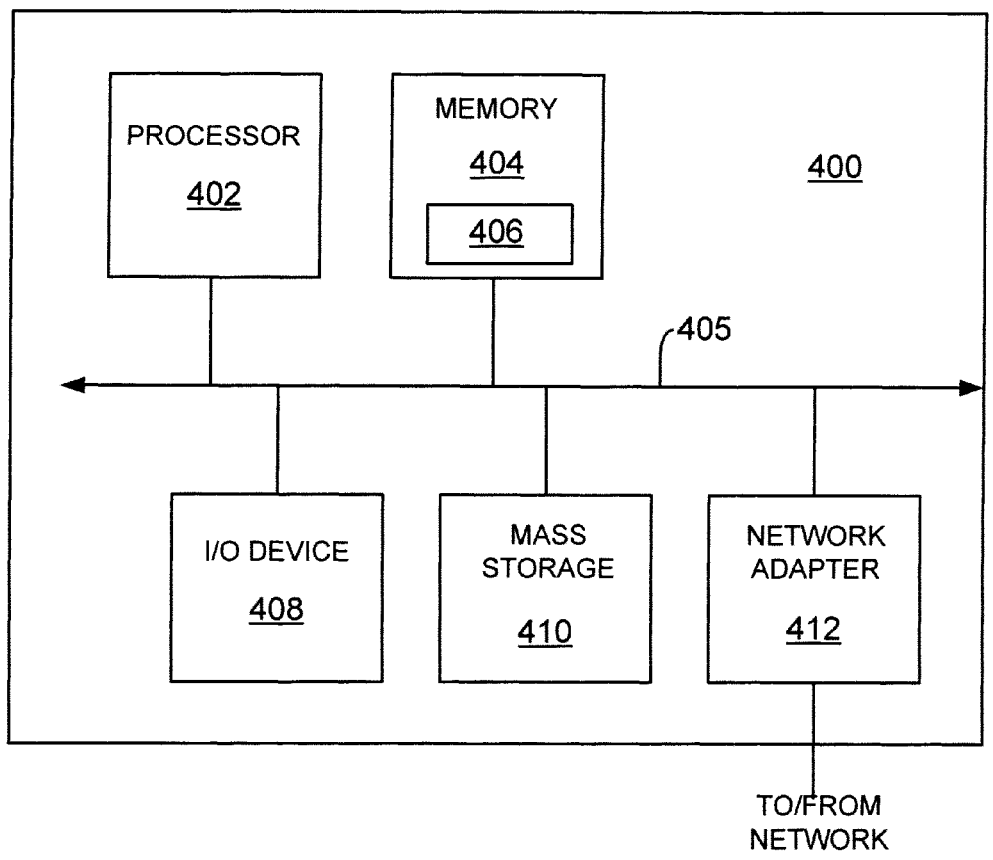
FIG. 4 shows a block diagram of a computing system for implementing the adaptive process of the present disclosure.

Processing System:

FIG. 4 is a high-level block diagram showing an example of the architecture of a processing system, at a high level, in which executable instructions described above, can be implemented. The processing system 400 can represent management console 18, clients 12, clients 114 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain embodiments, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements the migration techniques introduced above (e.g., the management application 18 in FIG. 1B) may reside in and may be executed (by processors 402) from memory 404.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers 20) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing: The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure followed by a "server" layer that includes hardware and computer software designed for cloud specific services. Details regarding these layers are not germane to the inventive embodiments.

The storage systems described above can be a part of the server layer for providing storage services. Monitoring module 30 may be executed at any system that is coupled to the cloud. Data structure 37 may stored at a storage device coupled to the cloud. The process steps of FIGS. 1C and 1D may be executed using monitoring module 30 and other programming instructions that may be adapted for the cloud computing environment.

Thus, a method and apparatus for managing errors in a system for accessing storage have been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
   identifying a plurality of components within a network used for processing input/output ("I/O") requests for reading and writing information at a storage device;
   identifying which of the plurality of components include sub-components;
   establishing a classification criteria for classifying error events associated with the plurality of components;
   establishing a threshold value for the plurality of components for error events associated with the plurality of components;
   establishing a classification criteria for classifying error events associated with each sub-component of the plurality of components that include sub-components;
   establishing a threshold value for each sub-component for error events associated with each sub-component;
   restricting usage of a component, based on an error event that violates the threshold value for the component wherein a frequency of the error event and classification of the error event is compared with the threshold value and the classification criteria for the component to determine that the threshold value for the component has been violated; and
   restricting usage of a sub-component if the component includes the sub-component when the error event violates the threshold value for the sub-component; wherein the frequency of the error event and classification of the error event is compared with the threshold value and the classification criteria for the sub-component to determine that the threshold value for the sub-component has been violated.

2. The method of claim 1, wherein the storage device is accessible to a computing system via a storage area network (SAN).

3. The method of claim 1, wherein the storage device is accessible as network attached storage.

4. The method of claim 1, wherein when the restricted component and the sub-component are a part of a cluster system then any node using the restricted component and the sub-component is notified of the restriction.

5. The method of claim 1, wherein a processor executable management application provides a user interface on a display device for establishing the classification criteria for classifying error events; and establishing the threshold value for the plurality of components and the sub-components.

6. The method of claim 1, wherein a processor executable storage operating system is used for establishing the classification criteria for classifying error events and establishing the threshold value for the plurality of components and the sub-components.

7. The method of claim 1, wherein a frequency of the event and a classification of the event associated with the component and the sub-component are stored as a data structure.

8. A machine implemented method, comprising:
receiving notification of an event associated with a component used in a network for processing an input/output (I/O) request for reading and writing information to a storage device;
determining if the component includes any sub-component;
determining a classification of the event to ascertain a severity level;
determining if an event frequency for the determined classification violates a threshold value that is set for restricting a usage of the component and the sub-component; and
restricting the usage of the component, the sub-component or both the component and the sub-component when the severity level and the event frequency for the classified event violate the set threshold value.

9. The method of claim 8, wherein the storage device is accessible to a computing system via a storage area network (SAN).

10. The method of claim 8, wherein the storage device is accessible as a network attached storage.

11. The method of claim 8, wherein when the restricted component and the sub-component are a part of a cluster system, then any node using the restricted component and the sub-component is notified of the restriction.

12. The method of claim 8, wherein a processor executable management application provides a user interface on a display device for establishing a classification criterion for classifying error events; and establishing the threshold value for the component and the sub-component.

13. The method of claim 8, wherein a processor executable storage operating system is used for establishing a classification criterion for classifying error events; and establishing the threshold value for the component and the sub-component.

14. A system, comprising:
a storage system coupled to a storage device and a client computing system via a plurality of components with some of the plurality of components having sub-components used for processing input/output requests for reading and writing information at the storage device; and
a processor executing instructions for establishing a classification criteria for classifying error events associated with the plurality of components; and establishing a threshold value for each of the plurality of components for error events associated with the plurality of components and each sub-component of any component having a sub-component;
wherein when an event frequency for an error event associated with a component and when applicable, a sub-component, violates an associated threshold value, then the usage of the component the sub-component or both the component and the sub-component is automatically restricted.

15. The system of claim 14, wherein the storage device is accessible to a computing system via a storage area network (SAN).

16. The system of claim 14, wherein the storage device is accessible as a network attached storage.

17. The system of claim 14, wherein when the restricted component is a part of a cluster system, then any node using the restricted component is notified of the restriction.

18. The system of claim 14, wherein the instructions are associated with a management application executed by the processor.

19. The system of claim 14, wherein the instructions are associated with a storage operating system for the storage system.

* * * * *